Aug. 14, 1923.
T. W. CONNER
AXLE STEERING KNUCKLE
Filed Sept. 18, 1922
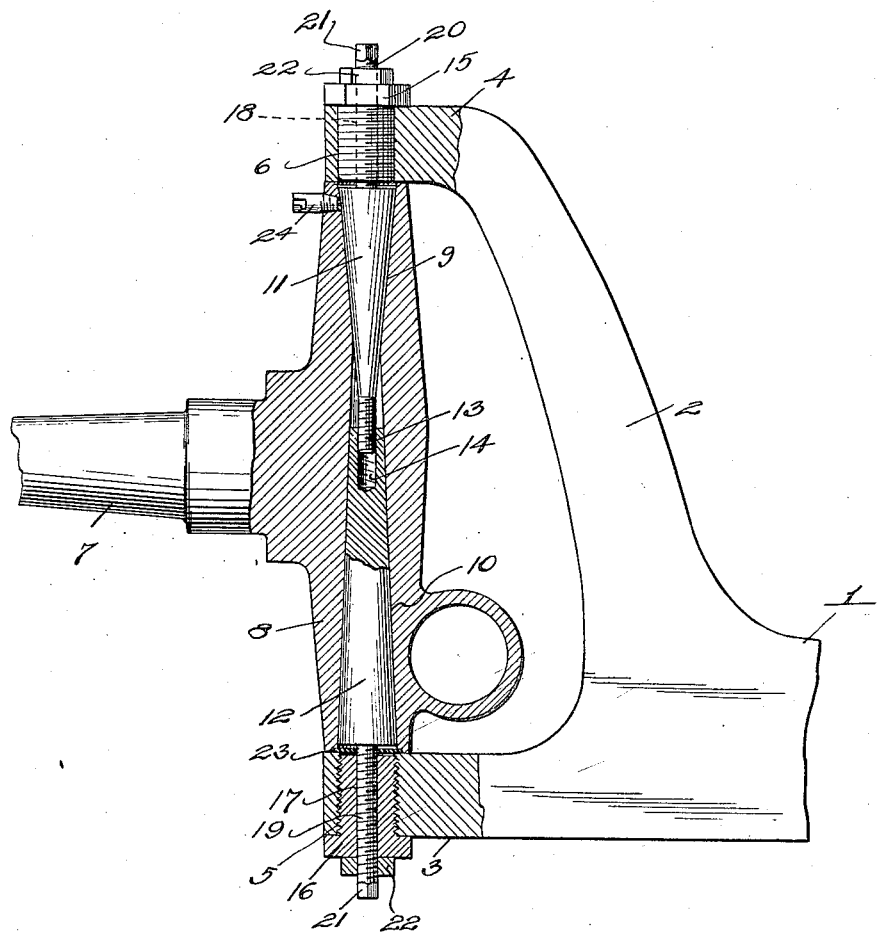
Inventor
Thomas W. Conner
By C. C. Shepherd
Attorney Patented Aug. 14, 1923.

1,464,901

UNITED STATES PATENT OFFICE.

THOMAS W. CONNER, OF SABINA, OHIO.

AXLE STEERING KNUCKLE.

Application filed September 18, 1922. Serial No. 588,796.

*To all whom it may concern:*

Be it known that I, THOMAS W. CONNER, a citizen of the United States, residing at Sabina, in the county of Clinton and State of Ohio, have invented certain new and useful Improvements in Axle Steering Knuckles, of which the following is a specification.

The present invention is directed to improvements in steering knuckles for automobile axles, and has for its primary object to provide a device of this character constructed in such manner that the wear imparted to the knuckle and associated parts can be compensated for.

A further object of the invention is to provide a novel form of pivotal connection between the axle fork and knuckle capable of being easily adjusted to take up wear on the movable parts due to the movement of the knuckle on its pivotal connection when the former is in motion.

With these and other objects in view, as will appear as the description proceeds, the invention consists in the novel features of construction, combinations of elements and arrangements of parts, and hereinafter to be fully described and pointed out in the appended claims.

In the drawing the figure designates a front view, partly in section.

Referring to the drawing 1 designates the axle and 2 the fork thereof, the arms 3 and 4 of the fork being provided with threaded openings 5 and 6, respectively. The axle spindle 7 has formed integrally therewith the usual knuckle 8 which is disposed between the arms 3 and 4 with its respective ends in mutual contact therewith as is the usual practice.

The knuckle 8 is provided with opposed vertically aligned tapered bores 9 and 10, the minor ends of which communicate, while the major ends thereof register with the respective openings 5 and 6.

Located respectively in the bores 9 and 10 are spindles 11 and 12, which are tapered to correspond with the tape of the respective bores. The minor end of the spindle 11 terminates in an integral threaded shank 13 adapted for threaded engagement in the socket 14 formed in the minor end of the spindle 12. It will be observed that the socket 14 is of such depth as to permit considerable movement of the shank 13 thereinto so that the spindles can be moved toward each other when necessary.

The openings 5 and 6 have threaded therein bushings 15 and 16, respectively, said bushings being provided respectively with threaded bores 17 and 18, the purpose of which will appear later.

The major ends of the spindles 11 and 12 are provided, respectively, with integral threaded bolts 19 and 20 which are adapted to engage the threaded bores 17 and 18, respectively, of the bushings 15 and 16, said bolts having squared heads 21 to facilitate their rotation with a wrench. The bolts are of such length as to project slightly beyond the heads of the bushings, and have engaged thereon jamb nuts 22.

The lower end of the spindle 12 has a packing washer 23 associated therewith to prevent leakage of grease from the lower end of the bore 10, the grease being forced into the bores through the cup 24 of any well known construction.

Since the bushings 15 and 16 are removable it will be obvious that the spindles can be readily placed through the openings 5 and 6 during the assembling of the device.

When the car is in motion the knuckle 8 is constantly moving, which action causes wear upon the spindles and bores, and to take up this wear it is only necessary to turn the bolts 19 and 20, thus rotating the spindles in a direction to cause the same to move toward each other, the presence of the socket 14 allowing considerable longitudinal movement of said spindles. Since the minor ends of the spindles are in threaded engagement it will be obvious that the same will form, in effect, a unitary structure upon which the knuckle can turn.

What is claimed is:

1. In combination with the fork of an axle, of a steering knuckle disposed between the arms of the fork, bushings carried by the arms of the fork, said knuckle having oppositely tapered aligned bores formed therein, tapered spindles having their major ends adjustably connected with the bushings and their minor ends adjustably connected to each other, as and for the purpose set forth.

2. In combination with the fork of an axle, of a steering knuckle rotatably mounted between the arms of the fork, said knuckle having bores formed therein, spindles having one of their ends adjustably connected with the arms of the fork and their other ends adjustably connected with each other In testimony whereof I affix my signature.

THOMAS W. CONNER.